(12) United States Patent
Moriya

(10) Patent No.: US 7,438,033 B2
(45) Date of Patent: Oct. 21, 2008

(54) VARIABLE VALVE TIMING CONTROL APPARATUS FOR INTERNAL COMBUSTION ENGINE AND INTERNAL COMBUSTION ENGINE INCLUDING VARIABLE VALVE TIMING CONTROL APPARATUS

(75) Inventor: Yoshihito Moriya, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 40 days.

(21) Appl. No.: 11/528,450

(22) Filed: Sep. 28, 2006

(65) Prior Publication Data
US 2007/0089696 A1    Apr. 26, 2007

(30) Foreign Application Priority Data
Oct. 24, 2005    (JP)    ............................. 2005-308067

(51) Int. Cl.
*F01L 1/34*    (2006.01)
(52) U.S. Cl. ............... 123/90.17; 123/90.15; 123/90.31
(58) Field of Classification Search ............... 123/90.17, 123/90.15, 90.31, 90.16
See application file for complete search history.

(56) References Cited

U.S. PATENT DOCUMENTS

| 5,957,095 | A | 9/1999 | Kako |
| 6,988,472 | B2 * | 1/2006 | Takahashi et al. ........ 123/90.15 |
| 2003/0106515 | A1 | 6/2003 | Kondo |
| 2005/0103298 | A1 | 5/2005 | Schafer et al. |
| 2005/0211207 | A1 | 9/2005 | Urushihata et al. |

FOREIGN PATENT DOCUMENTS

| JP | A 06-213021 | 8/1994 |
| JP | A 11-062643 | 3/1999 |
| JP | A 2002-227615 | 8/2002 |
| JP | A 2004-156603 | 6/2004 |
| JP | A 2004-245192 | 9/2004 |

* cited by examiner

*Primary Examiner*—Zelalem Eshete
(74) *Attorney, Agent, or Firm*—Oliff & Berridge, PLC (57) ABSTRACT

As for a reference valve timing varying rate A obtained by a deviation $\Delta\phi$ between a target VVT phase $\phi T$ and an actual VVT phase $\phi$, when a varying rate $\Delta\theta th$ of an accelerator opening degree resulting from the manipulation of the driver is relatively low, a VVT-ECU places a limit on the valve timing varying rate. When the varying rate $\Delta\theta th$ of the accelerator opening degree is relatively high, it varies the valve timing with the reference valve timing varying rate A.

23 Claims, 7 Drawing Sheets

VARIABLE VALVE TIMING CONTROL APPARATUS FOR INTERNAL COMBUSTION ENGINE AND INTERNAL COMBUSTION ENGINE INCLUDING VARIABLE VALVE TIMING CONTROL APPARATUS

This nonprovisional application is based on Japanese Patent Application No. 2005-308067 filed with the Japan Patent Office on Oct. 24, 2005, the entire contents of which are hereby incorporated by reference.

BACKGROUND OF THE INVENTION

1. Field of the Invention

The present invention relates to a variable valve timing control apparatus for an internal combustion engine for varying the valve timing of one of or both of an intake valve and an exhaust valve of the internal combustion engine, and to an internal combustion engine including the variable valve timing control apparatus. In particular, the present invention relates to an improvement in reducing or canceling shock that occurs when the valve timing varies.

2. Description of the Background Art

In recent years, among internal combustion engines (engines) incorporated into vehicles, an increasing number have employed variable valve timing apparatuses for varying the valve timing of intake valves and exhaust valves with the object of increasing output, reducing fuel consumption, and lowering exhaust emissions.

As disclosed in Japanese Patent Laying-Open No. 2004-245192, for example, most variable valve timing apparatuses in use at present drive a phase-varying mechanism with a hydraulic pressure from a hydraulic pump that actuates with rotary drive power from a crankshaft to vary the rotation phase of a camshaft with respect to a crankshaft, so as to vary the valve timing of intake valves and/or exhaust valves driven to open and close by the camshaft.

However, with such a hydraulically driven variable valve timing apparatus, in some cases, in cold conditions and on starting of the engine the hydraulic pressure is insufficient or the responsiveness of hydraulic control falls, and therefore there is a disadvantage that the accuracy of valve timing control is not fully achieved.

In this connection, as disclosed for example in Japanese Patent Laying-Open No. 6-213021, motor-driven variable valve timing apparatuses have been developed, in which a phase-varying mechanism is driven with drive power from a motor to vary the rotation phase of a camshaft with respect to a crankshaft and thereby vary a valve timing.

Although in the aforementioned motor-driven variable valve timing apparatus there is an advantage that the response speed is fast, this high response speed may possibly cause a sharp variation in the output torque of the engine when the valve timing is varied. Due to this variation in torque, sometimes shock (vibration) occurs with the vehicle body and let the passenger feel uncomfortable. For example, when advancing valve timing in accordance with an increase in engine load, the valve timing shifts to advance side greatly in a short period even in a situation where the driver gradually increases an accelerator opening degree. This instantaneous variation in the valve timing involves a variation in the combustion state in the combustion chamber, which in turn invites a sharp variation in torque. Thus, shock (vibration) occurs with the vehicle body.

As above, the motor-driven variable valve timing apparatus invites the trouble which has not been invited by the hydraulically driven variable valve timing apparatus that uses a hydraulic pump actuated by the rotary drive power of the crankshaft.

In order to solve the trouble, it may be possible to configure the variable valve timing apparatus by placing a certain upper limit on a valve timing varying rate so that the valve timing is always varied at a low rate with which shock does not occur with the vehicle body. For example, the maximum value of the rotation speed of the motor that is the drive source for varying the valve timing may be set low.

However, the valve timing then varies slowly even in a situation where the driver abruptly increases the accelerator opening degree, that is, where the driver requires quick acceleration. It takes a long time to attain the valve timing commensurate to the driver's requirement, and the engine response is not fully attained. Thus, full use of the true capability of the motor-driven variable valve timing apparatus is not made.

It should be noted that such a trouble is not limited to the motor-driven variable valve timing apparatus, and it may occur with any variable timing apparatus that is higher in response speed of the valve timing as compared to the aforementioned hydraulically driven variable valve timing apparatus (for example, the one having an electrohydraulic pump as the drive source).

SUMMARY OF THE INVENTION

The present invention has been made to solve the aforementioned problem, and its object is, as to a variable valve timing apparatus of relatively high response speed which is represented by a motor-driven variable valve timing apparatus, to eliminate a sharp variation in a valve timing not desired by the driver, to thereby provide a variable valve timing control apparatus that is capable of preventing occurrence of shock associated with a variation in the valve timing, and an internal combustion engine having the variable valve timing control apparatus.

Principle for Overcoming the Problem

According to the solving means of the present invention provided to achieve the aforementioned object, as for a valve timing varying rate (gain) obtained by the difference between a target valve timing and an actual valve timing, when a varying rate of an accelerator opening degree resulting from the manipulation of the driver is relatively low, it is determined that the driver does not require a quick variation of the valve timing, and a limit is placed on the valve timing varying rate to avoid shock in the vehicle body. On the other hand, when a varying rate of an accelerator opening degree resulting from the manipulation of the driver is relatively high, the valve timing is varied with a valve timing varying rate determined by the difference between a target valve timing and an actual valve timing, so that valve timing quickly approximates the target valve timing to meet the requirement of the driver.

Solving Means

Specifically, the present invention is predicated on a variable valve timing control apparatus for varying an opening and closing timing of at least one of an intake valve and an exhaust valve of an internal combustion engine. The variable valve timing control apparatus includes an accelerator opening degree sensor sensing an accelerator opening degree resulting from manipulation of a driver, and an operation unit. The operation unit calculates a timing deviation that is a difference between a target valve timing and an actual valve timing, calculates a varying rate of the accelerator opening degree, and adjusts a valve timing varying rate in approximating the actual valve timing to the target valve timing, based on the timing deviation and the varying rate of the accelerator opening degree.

By the specific feature, when an operation state of the internal combustion engine changes because of the driver changing the accelerator opening degree, for example, the valve opening/closing timing is varied so as to attain the suitable timing. In this case, the operation unit calculates a timing deviation that is the difference between a target valve timing and an actual valve timing. That is, it determines how much the current valve timing is advanced or retarded relative to the target valve timing. Further, the operation unit senses a varying rate of the accelerator opening degree resulting from the manipulation of the driver. That is, it recognizes the driver's requirement (the level of acceleration/deceleration requirement) by the varying rate of the accelerator opening degree. Based on such information, the operation unit adjusts the valve timing varying rate in approximating the actual valve timing to the target valve timing. That is, it selects whether control for quickly approximating the valve timing to the target valve timing or control for moderately approximating the valve timing to the target valve and executes. Specifically, when the varying rate of the accelerator opening degree is high, the driver requires quick acceleration or deceleration. Accordingly, in order to follow this, the valve timing varying rate (gain) is determined as a relatively high value based on the aforementioned timing deviation. On the other hand, when the varying rate of the accelerator opening degree is low, the driver does not require quick acceleration or deceleration. Accordingly, a limit is placed on the aforementioned valve timing varying rate to obtain a low valve timing varying rate, with which the valve timing is approximated to the target valve timing. Thus, a torque variation associated with the sharp variation in the valve timing can be prevented and occurrence of shock with the vehicle body can be prevented so as not to let the passenger of the vehicle feel uncomfortable.

A more specific configuration for solving the problem may be as follows. Similarly to the solving means above, it is predicated on a variable valve timing control apparatus for varying an opening and closing timing of at least one of an intake valve and an exhaust valve of an internal combustion engine. The variable valve timing control apparatus includes an accelerator opening degree sensor sensing an accelerator opening degree resulting from manipulation of a driver, and an operation unit. The operation unit calculates a timing deviation that is a difference between a target valve timing and an actual valve timing, calculates a varying rate of the accelerator opening degree, and compares a valve timing varying rate obtained by the timing deviation with a valve timing varying rate limiting value obtained by the varying rate of the accelerator opening degree. When the valve timing varying rate does not exceed the valve timing varying rate limiting value, the operation unit executes a valve timing control operation of approximating the actual valve timing to the target valve timing with the valve timing varying rate. When the valve timing varying rate exceeds the valve timing varying rate limiting value, the operation unit executes a valve timing control operation of approximating the actual valve timing to the target valve timing with the valve timing varying rate limiting value.

According to this specific feature also, as in the aforementioned solving means, when the varying rate of the accelerator opening degree is high, the driver requires quick acceleration or deceleration. Therefore, in order to follow this, the valve timing controlling operation is performed with a relatively high valve timing varying rate (gain) based on the aforementioned timing deviation. On the other hand, when the varying rate of the accelerator opening degree is low, the driver does not require quick acceleration or deceleration. Accordingly, the valve timing control operation is executed with a low valve timing varying rate in which a limit is placed on the valve timing varying rate as described above. Thus, occurrence of shock associated with a sharp variation in the valve timing can be prevented.

The valve timing varying rate limiting value is obtained as follows. First, the valve timing varying rate limiting value is obtained as a smaller value as the varying rate of the accelerator opening degree is smaller.

The valve timing varying rate limiting value is obtained as a constant value when the varying rate of the accelerator opening degree exceeds a prescribed rate, and the valve timing varying rate limiting value is obtained as a smaller value as the varying rate of the accelerator opening degree is smaller when the varying rate of the accelerator opening degree is at most the prescribed rate.

As above, employing different value as the valve timing varying rate limiting value in accordance with the varying rate of the accelerator opening degree, the valve timing varying rate is largely limited when the varying rate of the accelerator opening degree is very small. Thus, unintended occurrence of shock associated with a sharp variation in the valve timing can surely be prevented.

The valve timing varying rate limiting value can also be obtained as follows. That is, the valve timing varying rate limiting value is obtained as a constant value when the varying rate in an accelerator manipulation direction controlling a valve timing toward advance side (for example, in a direction increasing the accelerator opening degree) exceeds a first prescribed rate. The valve timing varying rate limiting value is obtained as a smaller value as the varying rate in the accelerator manipulation direction controlling a valve timing toward advance side is smaller when the varying rate in the accelerator manipulation direction controlling a valve timing toward advance side is at most the first prescribed rate. The valve timing varying rate limiting value is obtained as a constant value when the varying rate in an accelerator manipulation direction controlling a valve timing toward retard side (for example, in a direction reducing the accelerator opening degree) exceeds a second prescribed rate. The valve timing varying rate limiting value is obtained as a smaller value as the varying rate in the accelerator manipulation direction controlling a valve timing toward retard side is smaller when the varying rate in the accelerator manipulation direction controlling a valve timing toward retard side is at most the second prescribed rate. The second prescribed rate is set to a value lower than the first prescribed rate.

Thus, for example as to the case where the accelerator opening degree is increased at a certain varying rate and the case where the accelerator opening degree is reduced at the same varying rate, depending on the varying rate (for example, at an intermediate rate between the first prescribed rate and the second prescribed rate), the. valve timing varying rate for controlling the valve toward advance side and the valve timing varying rate for controlling the valve to retard side can be set to different rates. Specifically, even when the accelerator opening degree is increased and reduced at the same rate (for example at the intermediate rate between the first prescribed rate and the second prescribed rate), if the manipulation of reducing the accelerator opening degree is performed, that is, if the valve is controlled toward retard side, the rate (the retarding rate of the valve timing toward retard side) becomes relatively high (the limit on the rate is small, since the valve timing varying rate is not in the range where the valve timing varying rate limiting value is obtained as a smaller value as the varying rate of the accelerator opening degree is smaller), whereby it becomes possible to make the valve overlap small in a short period, and to rapidly reduce the amount of combustion gas returning from inside of a cylinder to the intake system (what is called an internal EGR (Exhaust Gas Recirculation) amount) to reserve the amount of the air-fuel mixture to be provided to the cylinder, thereby stabilizing the operation state of the internal combustion engine. Conversely, when the valve timing is advanced at this rate, the aforementioned occurrence of shock is concerned. Therefore, assuming that the manipulation of increasing accelerator opening degree is performed at the same rate as above, that is, if the valve is controlled toward advance side, the rate (the advancing rate of the valve timing toward advance side) becomes relatively low (the limit on the rate is great, since the valve timing varying rate is in the range where valve timing varying rate limiting value is obtained as a smaller value as the varying rate of the accelerator opening degree is smaller, and thus becomes low relative to the retarding rate of the valve timing toward retard side). Thus, a sharp torque variation is avoided and occurrence of shock in the vehicle body is prevented. As above, setting the valve timing varying rate differently (setting the degree of a limit on the valve timing varying rate differently) between the case where the valve is controlled toward advance side and the case where the valve is controlled toward retard side is effective in stabilizing the operation state of the internal combustion engine and in improving drivability.

As one example of the variable valve timing control apparatus to which each aforementioned solving means is applied, what is called a motor-driven variable valve timing apparatus is included, which includes a phase varying mechanism that varies a rotation phase of a camshaft with respect to a crankshaft of the internal combustion engine to vary a valve timing, wherein the phase varying mechanism is driven with drive power from a motor to vary the opening and closing timing of the valve.

An internal combustion engine including the variable valve timing control apparatus described above wherein an opening and closing timing of at least one of an intake valve and an exhaust valve is varied is also within the range of the technical idea of the present invention. That is, it is an internal combustion engine configured to adjust the valve timing varying rate based on the timing deviation and the varying rate of the accelerator opening degree.

In the present invention, as for the valve timing varying rate obtained by the difference between a target valve timing and an actual valve timing, when a varying rate of the accelerator opening degree resulting from the manipulation of the driver is relatively low, a limit is placed on the valve timing varying rate. This can prevent the valve timing from sharply varying despite a small manipulation of the accelerator by the driver, which would invite torque variation and results in occurrence of shock in the vehicle body. Thus, drivability can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention is described referring to the drawings. The embodiment describes an application of the present invention as a variable valve timing control apparatus that varies a valve timing of an intake valve of an internal combustion engine (engine) for a vehicle.

Schematic Configuration of Engine

Figure 1:
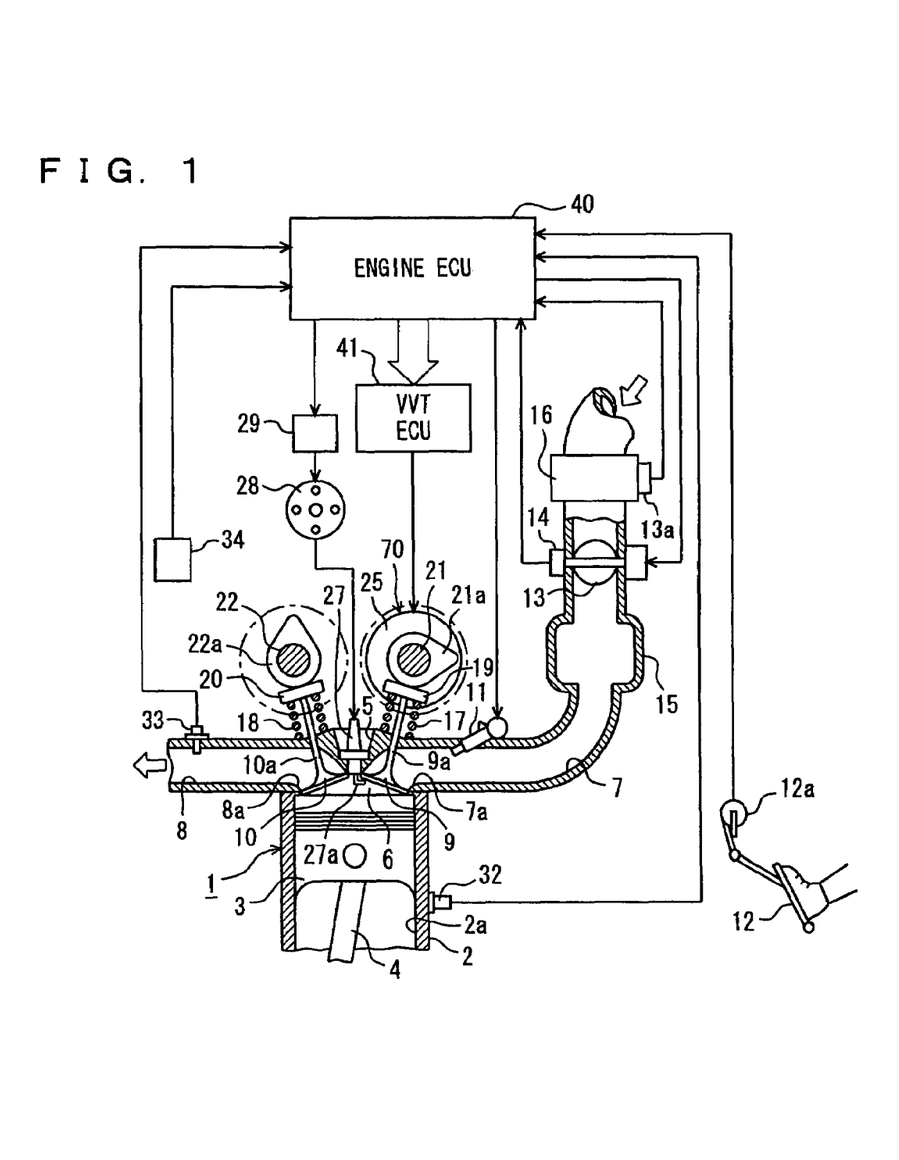
FIG. 1 shows a schematic configuration of an engine and its control system according to an embodiment.

FIG. 1 shows a schematic configuration of an engine 1 according to the present embodiment. As shown in FIG. 1, in engine 1, a piston 3 is provided to be movable upwardly and downwardly in a cylinder bore 2a formed in a cylinder block 2. Piston 3 is connected to a crankshaft by a connecting rod 4. A space enclosed by piston 3, cylinder bore 2a and a cylinder head 5 covering the top of cylinder bore 2a forms a combustion chamber 6.

An intake manifold 7 and an exhaust manifold 8 are provided to combustion chamber 6, each communicating thereto. To an intake port 7a at intake manifold 7 forming an opening to combustion chamber 6, an intake valve 9 is mounted. To an exhaust port 8a at exhaust manifold 8 forming an opening to combustion chamber 6, an exhaust valve 10 is mounted.

Outside air can be introduced through an air cleaner into intake manifold 7. Intake manifold 7 is provided with an injector 11 for fuel injection near intake port 7a so that fuel is injected into intake manifold 7. Injector 11 is supplied with fuel of a prescribed pressure from a fuel tank by an operation of a fuel pump. An air-fuel mixture, which is constituted of the fuel injected from injector 11 and taken into intake manifold 7 and the outside air, is introduced into combustion chamber 6 through intake port 7a in accordance with a valve-opening operation of intake valve 9. The air-fuel mixture introduced into combustion chamber 6 explodes and combusts, and thereby provides drive power, via piston 3, crankshaft and the like, to engine 1. Further, the combustion gas combusted in combustion chamber 6 is emitted in accordance with a valve opening operation of exhaust valve 10, from exhaust port 8a through exhaust manifold 8 to the outside.

A throttle valve 13 is provided midway along intake manifold 7. To one end of a rotation shaft of throttle valve 13, a throttle motor 13a that is an actuator for driving throttle valve 13 is provided. To the other end thereof, a throttle sensor 14 for detecting an opening degree of throttle valve 13 is provided. That is, throttle valve 13 is configured as an electronic control throttle that has its opening degree adjusted by throttle motor 13a, and an intake air amount to intake manifold 7 is adjusted by its opening/closing operation.

A surge tank 15 smoothing pulsation in an intake air amount is provided on the downstream side relative to throttle valve 13. Further, an air flow meter 16 detecting an intake air amount taken into intake manifold 7 from the outside is provided on an upstream side relative to throttle valve 13.

A spark plug 27 is mounted at a cylinder central portion in cylinder head 5 and its discharging portion 27a exists inside combustion chamber 6, so that the air-fuel mixture introduced into combustion chamber 6 can be ignited. Spark plug 27 is driven based on an ignition signal distributed by a distributor 28. Distributor 28 synchronizes a high voltage output from igniter 29 to the crank angle of engine 1 and distributes it to spark plug 27.

A coolant temperature sensor 32 detecting the temperature of the coolant of engine 1 is mounted to cylinder block 2. An oxygen sensor 33 detecting the oxygen concentration in the exhaust gas is mounted midway along exhaust manifold 8. Further, a vehicle speed sensor 34 detecting a traveling speed (vehicle speed) of the vehicle is provided.

An accelerator pedal 12 arranged in the vehicle interior is provided with an accelerator opening degree sensor 12a. Accelerator opening degree sensor 12a outputs a detect signal corresponding to an accel stroke (accelerator opening degree) of accelerator pedal 12. By recognizing an amount of variation in accelerator opening degree per unit time, a manipulation speed of the accelerator can be recognized.

Accelerator opening degree sensor 12a, throttle sensor 14, a full-closure switch 14a (see FIG. 2) provided to throttle sensor 14, air flow meter 16, a crank angle sensor 30, a cam angle sensor 31 (see FIG. 2), coolant sensor 32, oxygen sensor 33, vehicle speed sensor 34, a starter switch 39 (see FIG. 2) and the like are electrically connected to an input side of an engine electronic control apparatus (hereinafter simply referred to as "an engine ECU (Electronic Control Unit)"). To an output side of engine ECU 40, injector 11, igniter 29 and the like are electrically connected. Engine ECU 40 suitably controls injector 11, igniter 29 and the like based on each input signal.

Engine ECU 40 is a control apparatus that mainly governs a fuel injection timing and a fuel injection amount of injector 11, an ignition timing of spark plug 27 and the like. In addition to engine ECU 40, engine 1 according to the present embodiment is provided with a VVT-ECU 41 for controlling a variable valve timing control apparatus (hereinafter referred to as VVT (Variable Valve Timing)) 70, which will be described later. VVT-ECU 41 governs control of a rotation speed of an output shaft 84 (see FIG. 5) of a VVT motor 25, which will be described later. Therefore, to an input side of VVT-ECU 41, each of detection values such as an accelerator opening degree, a throttle opening degree, a throttle full closure signal, an engine speed, a coolant temperature, a vehicle speed, a starter signal, an intake air amount and the like is input as a data signal. To an input side of VVT-ECU 41, a brake signal from brake sensor 36 (see FIG. 3) is input. Then, VVT-ECU 41 determines the magnitude of a valve overlap amount (a valve timing advancing position of intake valve 9) corresponding to an operation state of engine 1 based on input data signals and the like, and outputs a valve timing control signal for suitably controlling VVT motor 25, to thereby control an opening/closing timing of intake valve 9.

Description of Engine ECU 40 and VVT-ECU 41

Figure 2:
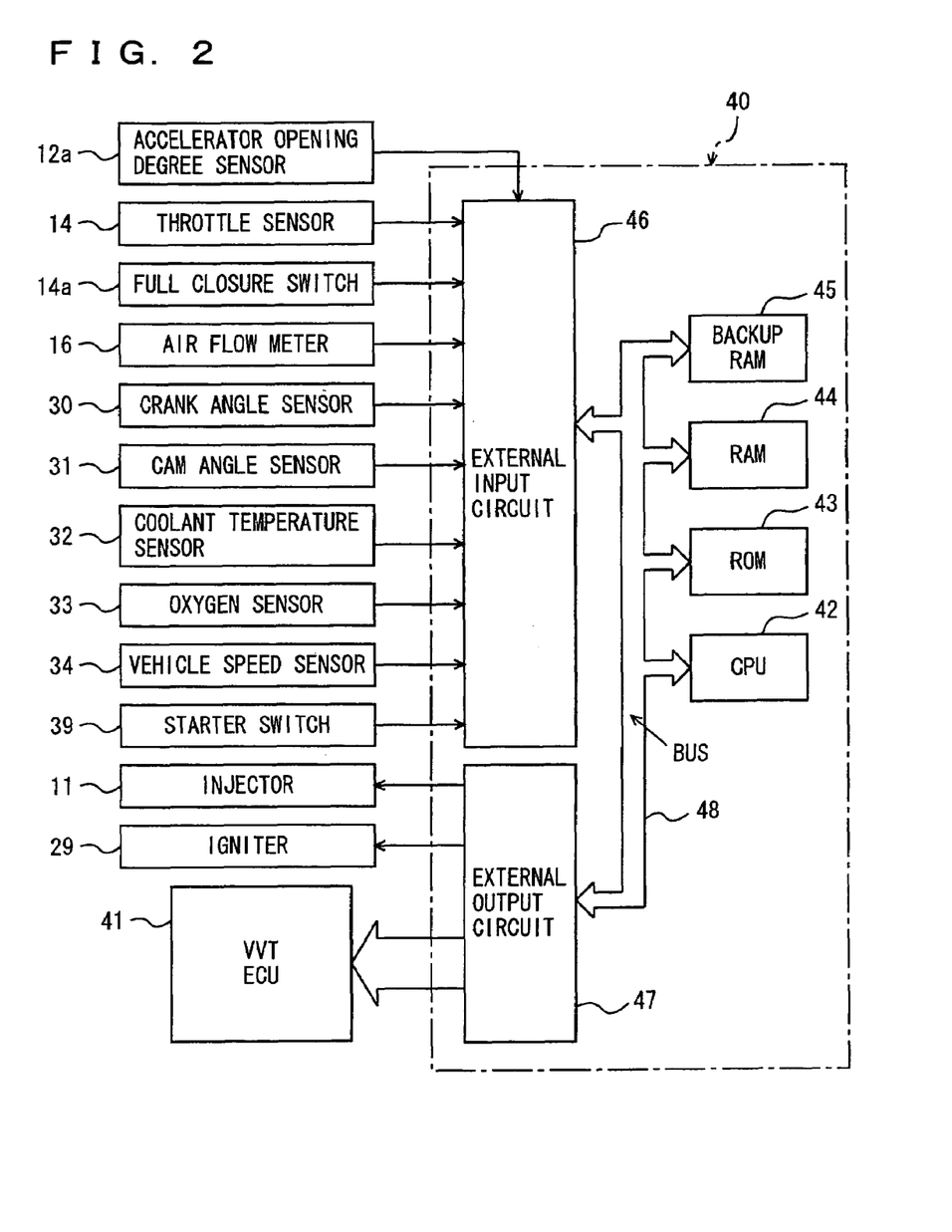
FIG. 2 is a block diagram related to a description of an electric configuration of an engine ECU.
Figure 3:
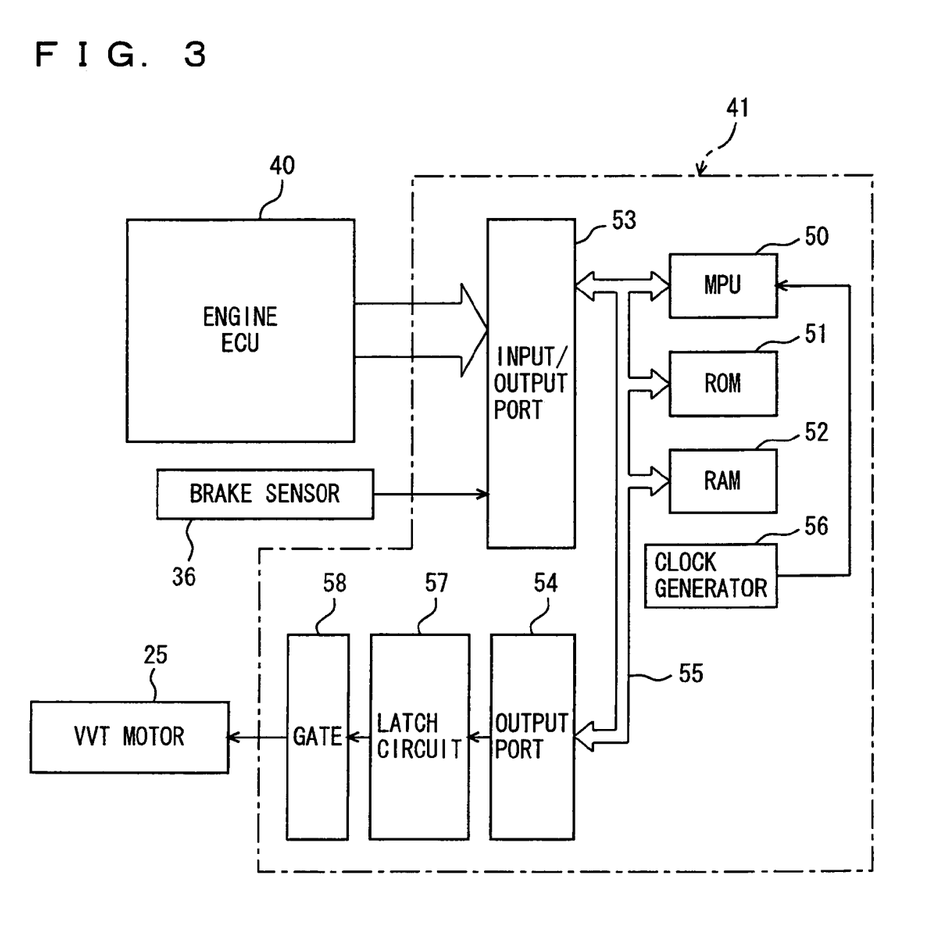
FIG. 3 is a block diagram related to a description of an electric configuration of a VVT-ECU.

Next, referring to the block diagrams of FIGS. 2 and 3, each configuration of engine ECU 40 and VVT-ECU 41 is described. FIG. 2 is a block diagram related to a description of an electric configuration associated with engine ECU 40. Engine ECU 40 is configured as a logic operation circuit wherein a CPU (Central Processing Unit) 42, an ROM (Read Only Memory) 43 storing in advance a prescribed control program or the like, an RAM (Random Access Memory) 44 temporarily storing an operation result of CPU 42, a backup RAM 45 saving pre-stored data and the like, as well as an external input circuit 46 and an external output circuit 47 and the like are connected by a bus 48.

To external input circuit 46, accelerator opening degree sensor 12a, throttle sensor 14, full closure switch 14a, air flow meter 16, crank angle sensor 30, cam angle sensor 31, coolant sensor 32, oxygen sensor 33, vehicle speed sensor 34, starter switch 39 and the like are each connected. To external output circuit 47, injector 11, igniter 29, VVT-ECU 41 and the like are each connected. CPU 42 reads each signal input through external input circuit 46 as an input value, and suitably controls injector 11, igniter 29 and the like based on the read input value.

Among the signals read as input values through external input circuit 46 from accelerator opening degree sensor 12a, full closure switch 14a, air flow meter 16, sensors 14, 30-34, starter switch 39 and the like, CPU 42 outputs an accelerator opening degree, a throttle opening degree, a full closure signal, an engine speed, a coolant temperature, a starter signal, an intake air amount and the like to VVT-ECU 41 through external output circuit 47 as data signals.

FIG. 3 is a block diagram related to a description of an electric configuration associated with VVT-ECU 41. VVT-ECU 41 is configured as a logic operation circuit wherein a MPU (Micro Processing Unit) 50, an ROM 51 storing in advance a prescribed control program or the like for VVT 70 and the like, an RAM 52 temporarily storing an operation result of MPU 50, as well as an input/output port 53 and output port 54 are connected by a bus 55. VVT-ECU 41 includes a clock generator 56 generating cyclic clock pulse and supplying MPU 50 with the clock pulse. VVT-ECU 41 further includes a latch circuit 57 and a gate 58 connected to output port 54 thereof Input/output port 53 is connected to engine ECU 40. To input/output port 53, brake sensor 36 is connected. To gate 58, VVT motor 25 is connected.

MPU 50 reads each signal, such as an accelerator opening degree, a throttle opening degree, a throttle full closure signal, an engine speed, a coolant temperature, a starter signal, an intake air amount, a brake signal and the like input through input/output port 53 as an input value, and suitably controls VVT motor 25 based on the read input value. That is, MPU 50 operates and determines the rotation speed of VVT motor 25 based on the read input value and in accordance with a control program stored in ROM 51, and outputs the operation result to latch circuit 57 through output port 54, as a valve timing control signal. Latch circuit 57 receives the valve timing control signal, and outputs an open/close instruction of gate 58 in accordance with a prescribed sequence so that the signal is executed. Gate 58 follows the open/close instruction and drives VVT motor 25.

Configuration of Valve Train and VVT 70

Next, a valve train for performing open/close operation of intake valve 9 and exhaust valve 10, and VVT 70 controlled by VVT-ECU 41 to adjust open/close timing of intake valve 9 is described.

As shown in FIG. 1, intake valve 9 and exhaust valve 10 have respective stems 9a, 10a extending upwardly. Valve springs 17, 18, valve lifters 19, 20 and the like are mounted to the upper portions of stems 9a, 10a, respectively. To valve lifters 19, 20, cams 21a, 22a are provided to engage, respectively. Cams 21a, 22a are respectively formed on camshaft 21 on the intake side and camshaft 22 on the exhaust side supported by cylinder 5, as many as the number of cylinders. Intake valve 9 and exhaust valve 10 are urged by the urging force of valve springs 17, 18 upwardly, that is, in a direction closing intake port 7a and exhaust port 8a.

Figure 4:
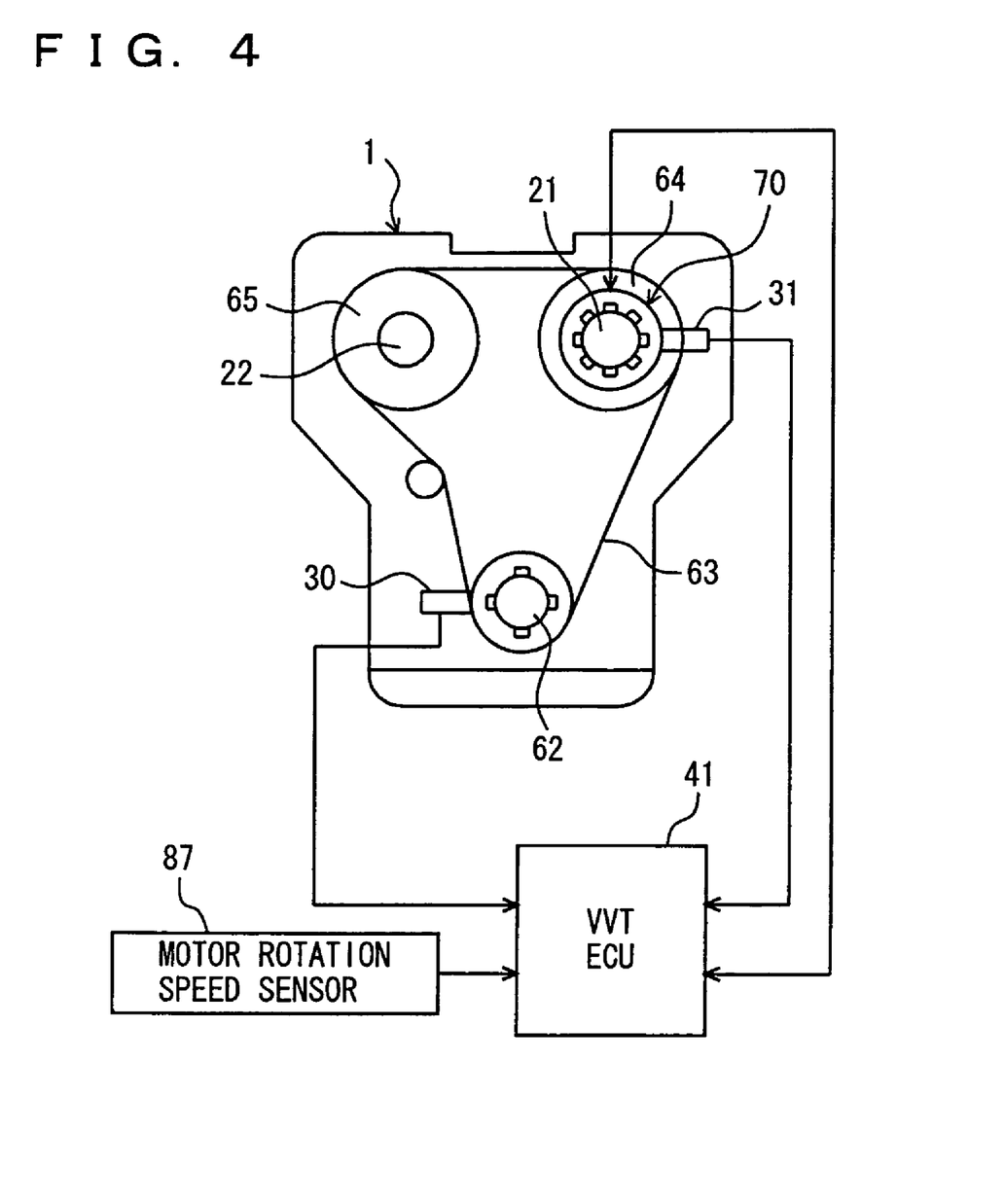
FIG. 4 is a front view of an engine showing a state where a variable valve timing apparatus is incorporated into the engine.
Figure 5:
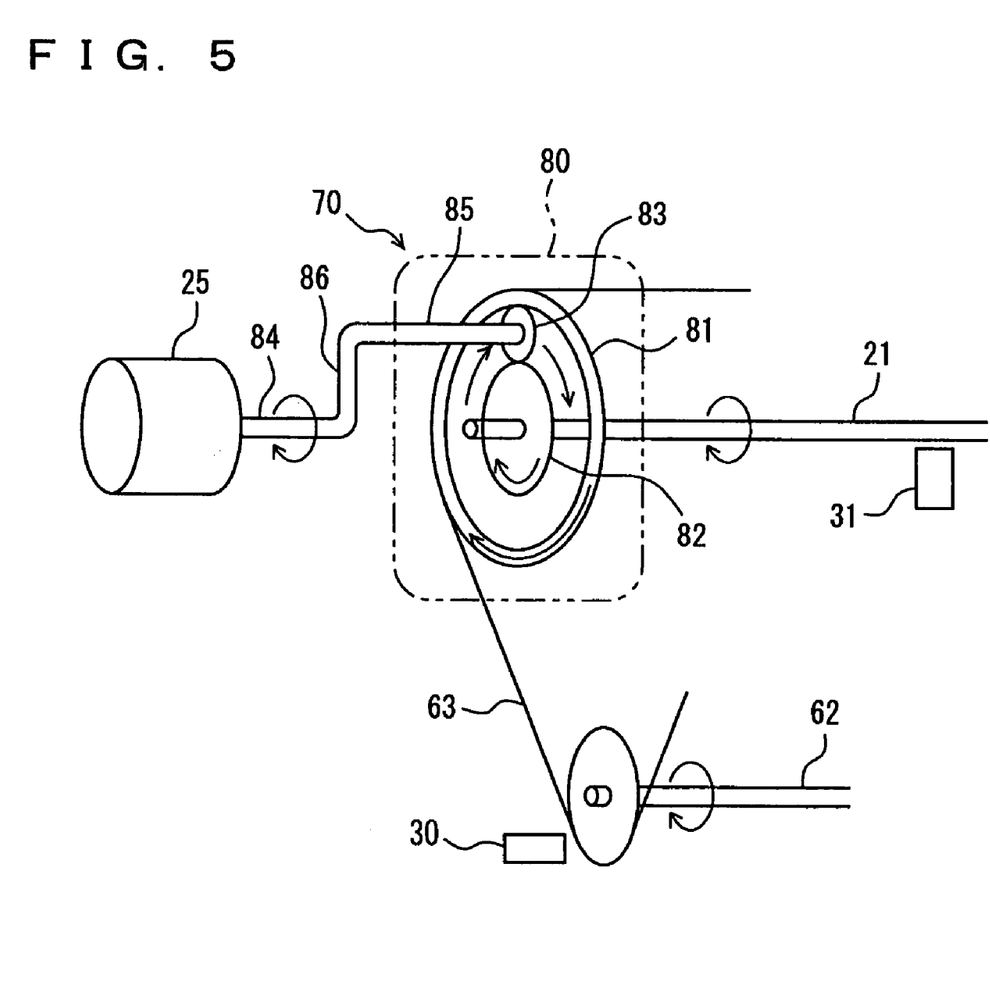
FIG. 5 is a schematic configuration diagram related to a description of an operation principle of the variable valve timing apparatus.

Engine 1 of the present embodiment includes motor-driven VVT 70 varying opening/closing timing of intake valve 9. In the following, referring to FIGS. 4 and 5, FIG. 4 is a front view of engine 1 showing a state where VVT 70 is incorporated into engine 1. FIG. 5 is a schematic configuration diagram related to a description of an operation principle of VVT 70.

As shown in FIG. 4, a timing chain (or timing belt) 63 is suspended over crankshaft 62, an intake-side cam sprocket (or cam pulley) 64 and an exhaust-side cam sprocket (or cam pulley) 65, and the motive power from crankshaft 62 is transmitted by timing chain 63 through sprockets 64, 65 to intake-side camshaft 21 and exhaust-side camshaft 22. On intake-side camshaft 21 side, motor-driven VVT 70 is provided. Varying by VVT 70 the rotation phase of intake-side camshaft 21 (camshaft phase) relative to crankshaft 62, the valve timing of intake valve 9 driven to open and close by intake-side camshaft 21 is varied.

On peripheral side of intake-side camshaft 21, cam angle sensor 31 is mounted, which outputs a cam angle signal for each prescribed cam angle. On the other hand, on peripheral side of crankshaft 62, crank angle sensor 30 is mounted, which outputs a crank angle signal for each prescribed crank angle.

Now, VVT 70 is described in more detail. As shown in FIG. 5, VVT 70 includes a phase varying mechanism 80, which is configured to include: an outer gear 81, with internal teeth, arranged concentrically with the intake-side camshaft 21; an inner gear 82, with external teeth, arranged inside and concentrically with this outer gear 81; and a planetary gear 83, arranged between and meshing with outer gear 81 and inner gear 82. Outer gear 81 is provided so as to rotate integrally with intake-side sprocket 64, which rotates synchronously with crankshaft 62. Inner gear 82 is provided so as to rotate integrally with intake-side camshaft 21. Planetary gear 83, by turning so as to describe a circular orbit about inner gear 82 while meshing with outer gear 81 and the inner gear 82, carries out the function of transmitting the rotary power of outer gear 81 to inner gear 82. By the turning speed (revolving speed) of planetary gear 83 with respect to the rotational speed of inner gear 82 (rotational speed of intake-side camshaft 21) being varied, the rotation phase (camshaft phase) of inner gear 82 with respect to outer gear 81 is adjusted.

VVT motor 25 for varying the turning speed of planetary gear 83 is provided to engine 1. Output shaft 84 of VVT motor 25 is arranged coaxially with intake-side camshaft 21, outer gear 81 and inner gear 82, and output shaft 84 of VVT motor 25 and a support shaft 85 supporting planetary gear 83 are connected by a connecting member 86 extending in the radial direction. As a result, along with rotation of VVT motor 25 planetary gear 83 can turn (revolve) along its circular orbit around inner gear 82 while rotating (autorotating) about support shaft 85. A motor rotation speed sensor 87 (see FIG. 4) detecting the rotational speed of VVT motor 25 (the rotational speed of output shaft 84) is mounted on VVT motor 25.

In VVT 70, when the rotational speed of VVT motor 25 is matched to the speed of intake-side camshaft 21, so that the revolving speed of planetary gear 83 is matched to the rotational speed of inner gear 82 (the rotational speed of outer gear 81), the rotation phase difference between outer gear 81 and inner gear 82 is held steady and the valve timing (camshaft phase) is thereby held steady.

When the valve timing of intake valve 9 is to be advanced, the rotational speed of VVT motor 25 is made faster than the rotational speed of intake-side camshaft 21, so that the revolving speed of planetary gear 83 is made faster than the rotational speed of inner gear 82. By this means, the rotation phase of inner gear 82 with respect to outer gear 81 is advanced, and the valve timing (camshaft phase) is advanced.

When on the other hand the valve timing of intake valve 9 is to be retarded, the rotational speed of VVT motor 25 is made slower than the rotational speed of intake-side camshaft 21, so that the revolving speed of planetary gear 83 is made slower than the rotational speed of inner gear 82. By this means, the rotation phase of inner gear 82 with respect to outer gear 81 is retarded and the valve timing is thereby retarded.

Figure 7:
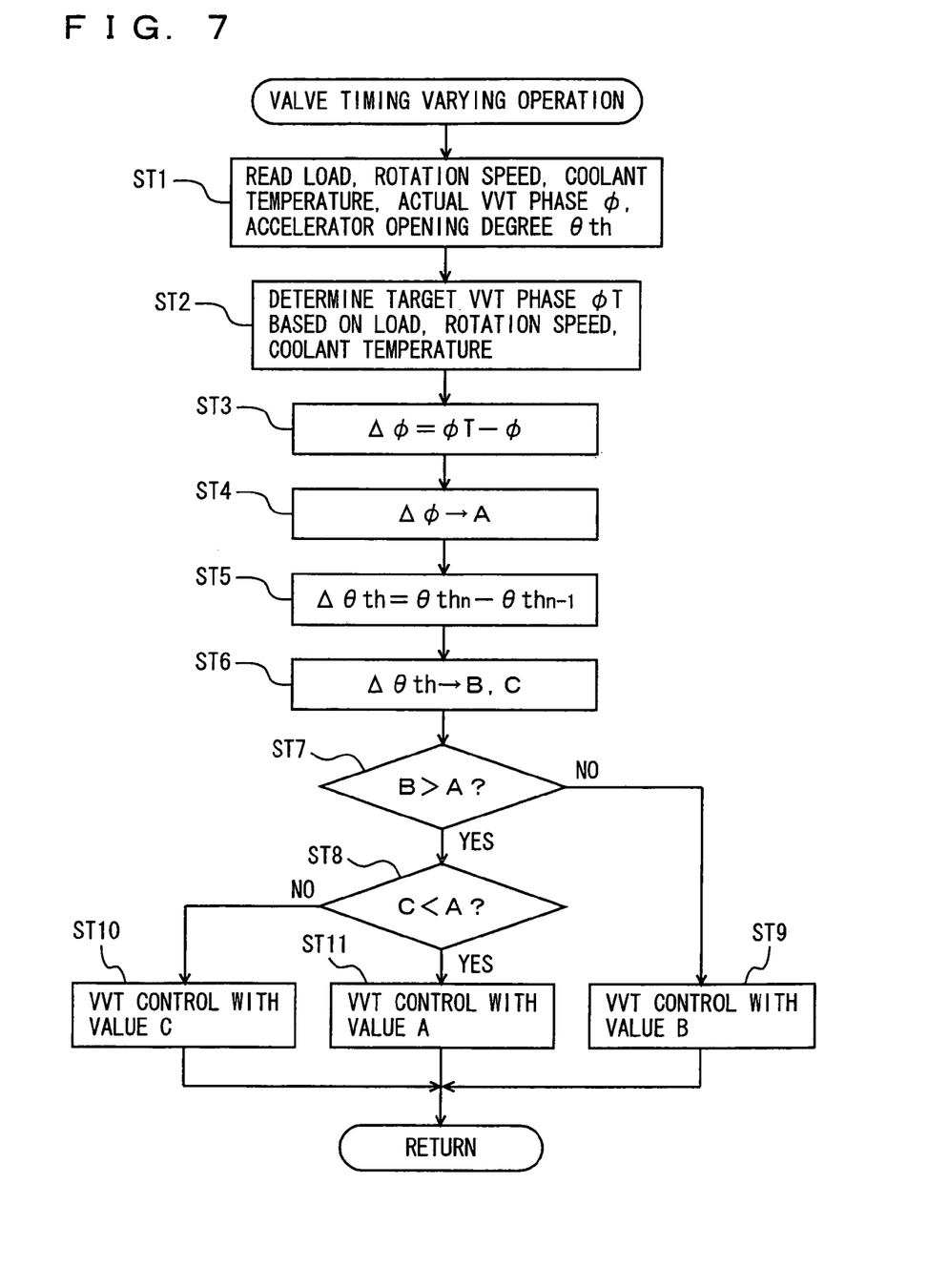
FIG. 7 is a flowchart for describing a procedure of a valve timing varying operation.

Thus, operations of advancing and retarding the opening/closing timing of intake valve 9 is carried out by VVT-ECU 41 controlling VVT motor 25. More specifically, VVT-ECU 41 executes a variable valve timing control program, which is shown in FIG. 7 and will be described later, thereby controls VVT motor 25 so as to reduce a deviation $\Delta\phi$ between a target valve timing (target VVT phase $\phi$T) and an actual valve timing (actual VVT phase $\phi$) of intake valve 9.

The present embodiment is characterized in that the valve timing varying rate (an advance amount or retard amount per unit time) when approximating the actual valve timing to the target valve timing is varied, in accordance with an operation state of engine 1 or a driving manipulation state of the driver. In the following, a configuration for varying the valve timing varying rate and a valve timing varying operation thereof are described. In the following description, the valve timing advancing side is referred to as "positive", while the valve timing retarding side is referred to as "negative".

Description of Control Map

Figure 6A:
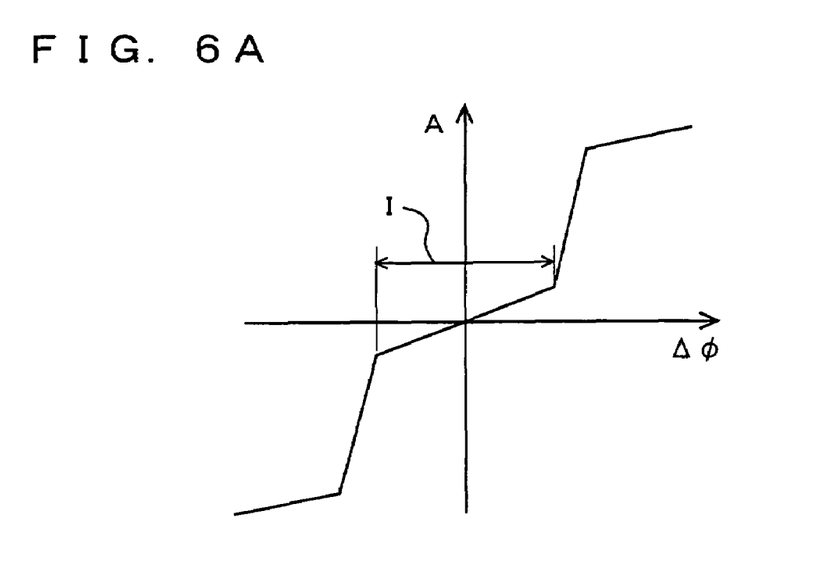
FIG. 6A shows a gain calculation map.

First, ROM 51 of VVT-ECU 41 of the present embodiment stores two maps, which are described in the following. One of the maps is the one shown in FIG. 6A, which is a gain calculation map for obtaining a reference valve timing varying rate A from timing deviation $\Delta\phi$, which is the difference between the target valve timing and the actual valve timing. That is, it is a map for obtaining reference valve timing varying rate A from a result of an operation by MPU 50 for obtaining timing deviation $\Delta\phi$, which is the difference between the target valve timing and the actual valve timing (and which is a positive value when the actual valve timing is retarded relative to the target valve timing, whereas it is a negative value when the actual valve timing is advanced relative to the target valve timing). In this gain calculation map, as the absolute value of timing deviation $\Delta\phi$ is greater, the absolute value of the gain is set to be greater so that the valve timing varying rate is increased. In other words, the varying rate of the valve timing to advance side is set to be higher when the actual valve timing is retarded relative to the target valve timing and as the retard amount (deviation) is greater (i.e., when timing deviation $\Delta\phi$ is positive and as the absolute value thereof is greater). The varying rate of the valve timing to retard side is set to be higher when the actual valve timing is advanced relative to the target valve timing and as the advance amount (deviation) is greater (i.e., when the absolute value of timing deviation $\Delta\phi$ is negative and as the absolute value thereof is greater). It is noted that, in the gain calculation map, it is set so that the varied amount of gain for the variation in timing deviation $\Delta\phi$ is small (i.e., the tilt of the characteristic line in-the drawing is small) in a range where the absolute value of timing deviation $\Delta\phi$ is relatively small (range I in the drawing), to thereby suppress great variation of the valve timing in a short period.

Figure 6B:
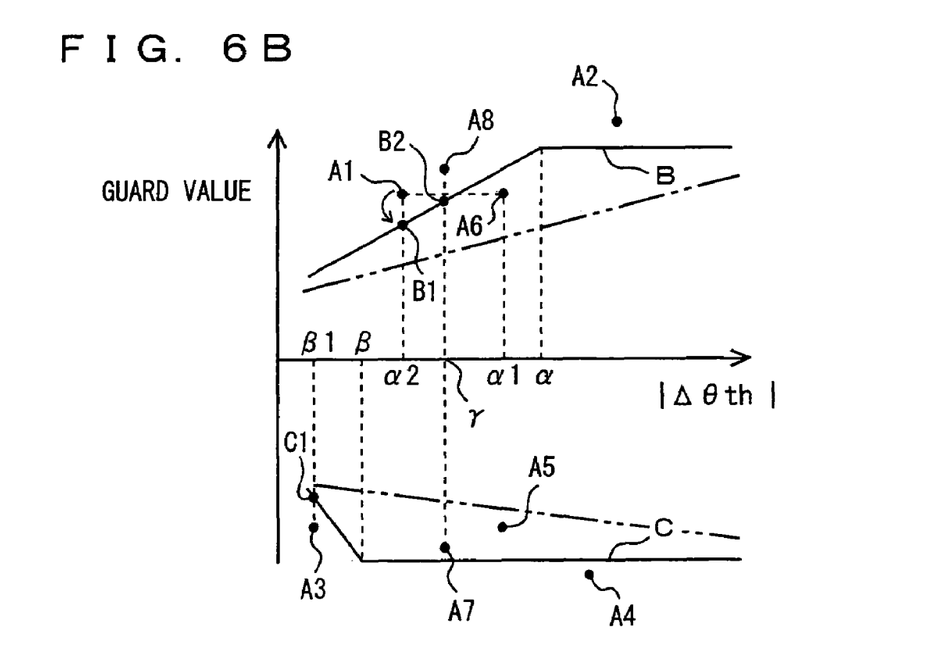
FIG. 6B shows a guard calculation map.

The other map stored in ROM 51 of VVT-ECU 41 is the one shown in FIG. 6B, which is a guard calculation map for placing a limit on the valve timing varying rate in accordance with the varying rate of the accelerator opening degree. That is, it is a map for determining whether or not to place a limit on reference valve timing varying rate A obtained by the aforementioned gain calculation map, in accordance with the varying rate of the accelerator opening degree (including both the varying rate in the direction increasing the accelerator opening degree and the varying rate in the direction decreasing the accelerator opening degree). In the guard calculation map, an advance side guard line B for regulating the valve timing varying rate when the actual valve timing is retarded relative to the target valve timing, that is, when the valve timing is to be varied to advance side, and a retard side guard line C for regulating the valve timing varying rate when the actual valve timing is advanced relative to the target valve timing, that is, when the valve timing is to be varied to retard side, are set. These guard lines B, C are for obtaining a guard value (a limit value of the valve timing varying rate) placing a limit on the valve timing varying rate in accordance with the absolute value of the varying rate of the accelerator opening degree. When reference valve timing varying rate A obtained by the gain calculation map is a value in a range between guard lines B, C (the value not outside the allowable range of the valve timing varying rate: within a limit value), the valve timing varying operation is performed with reference valve timing varying rate A as it is. When reference valve timing varying rate A is outside the range between guard line B, C, the valve timing control operation is performed with a guard value regulated by guard lines B, C.

In the following, these guard lines B, C are described. Guard line B on positive side is for restricting (limiting) a valve timing varying rate when the valve timing is to be varied to advance side. When the absolute value of the varying rate of accelerator opening degree exceeds a first prescribed rate (α in the drawing), the valve timing varying rate is to be limited by a certain guard value. When the absolute value of the varying rate of accelerator opening degree is at most first prescribed rate α, the valve timing varying rate is to be limited by a smaller guard value as the varying rate is smaller.

Guard line C on negative side is for limiting a valve timing varying rate when the valve timing is to be varied to retard side. When the absolute value of the varying rate of accelerator opening degree exceeds a second prescribed rate (β in the drawing), the valve timing varying rate is to be limited by a certain guard value. When the absolute value of the varying rate of accelerator opening degree is at most second prescribed rate β, the valve timing varying rate is to be limited by a smaller guard value (a guard value having smaller absolute value) as the varying rate is smaller. Second prescribed rate β is set to a value lower than first prescribed rate α. That is, guard line C is set so as to loosen the limit on the valve timing varying rate when the valve timing is to be retarded.

Description of Valve Timing Varying Operation

Next, referring to the flowchart of FIG. 7, the procedure of the valve timing varying operation utilizing each map described above executed by VVT-ECU 41 is described. The variable valve timing control program is, for example, executed at intervals of a predetermined period after an ignition switch (not shown) is turned on. Alternatively, it is executed every time the clock pulse is produced from clock generator 56 described above.

When this program starts, first, in step ST1, an engine load, an engine speed, a coolant temperature, an actual VVT phase φ, and accelerator opening degree θth are read. It is noted that actual VVT phase φ is calculated based on a crank angle signal output from crank angle sensor 30 and a cam angle signal output from cam angle sensor 31. Thereafter, in step ST2, a target VVT phase φT is determined from the engine load, the engine speed, and the coolant temperature.

In step ST3, deviation ($\Delta\phi=\phi T-\phi$) between target VVT phase φT and actual VVT phase φ is calculated (a timing deviation calculation operation). When deviation Δφ is a positive value, actual VVT phase φ is in a position retarded relative to target VVT phase φT, and the valve timing is to be controlled so as to be varied to advance side. If on the other hand deviation Δφ is a negative value, actual VVT phase φ is in a position advanced relative to target VVT phase φT, and the valve timing is to be controlled so as to be varied to retard side.

In step ST4, based on deviation Δφ obtained in step ST3 and referring to the aforementioned gain calculation map, reference valve timing varying rate A is obtained. As can be seen from the gain calculation map (FIG. 6A), as the absolute value of timing deviation Δφ is greater, the absolute value of the gain is also greater and the reference valve timing varying rate A is obtained in a greater value.

In step ST5, from the accelerator opening degree read for each prescribed sampling timing, the difference between the present value and the previous value of the accelerator opening degree ($\Delta\theta th=\Delta\theta th_n-\Delta\theta th_{n-1}$) is calculated. The difference Δθth between the present value and the previous value of the accelerator opening degree is the varied amount of the accelerator opening degree for each constant sampling timing, and therefore can be regarded as a varying rate of the accelerator opening degree (manipulation speed of the driver) (an operation of sensing the accelerator opening degree varying rate).

Then, in step ST6, based on the calculated varying rate of the accelerator opening degree and referring to the aforementioned guard calculation map (FIG. 6B), advance side guard value B and retard side guard value C are respectively obtained. In the operation in step ST5, Δθth takes on a positive value when a manipulation increasing the accelerator opening degree is performed and takes on a negative value when a manipulation reducing the accelerator opening degree is performed. In the guard calculation map, a guard value is determined by the absolute value of Δθth, and the advance side guard value B (positive value) and the retard side guard value C (negative value) are respectively obtained. Advance side guard value B as used herein is a value for placing a limit on a varying rate when a valve timing is to be advanced, whereas retard side guard value C is a value for placing a limit on a varying rate when a valve timing is to be retarded.

Thus, after reference valve timing varying rate A is obtained based on deviation Δφ and each guard value B, C is obtained based on the varying rate of the accelerator opening degree, they are compared with each other to thereby perform an operation of determining the valve timing varying rate (an operation of adjusting the valve timing varying rate). That is, in step ST7, it is determined whether reference valve timing varying rate A is less than advance side guard value B, and when YES, it is determined that the control direction of the valve timing is on retard side (i.e., reference valve timing varying rate A is a negative value), or, even if the direction is on advance side, reference valve timing varying rate A is relatively low and less than guard value B (i.e., reference valve timing varying rate A is a positive value and less than guard value B), and the process goes to step ST8.

On the other hand, when it is determined NO in step ST7, it is determined that the control direction of the valve timing is on advance side and reference valve timing varying rate A is relatively high and at least guard value B (i.e., reference valve timing varying rate A is a positive value and at least guard value B: for example positions of points A1 and A2 in FIG. 6B), and the process goes to step ST9 where a valve timing varying operation is performed with the valve timing varying rate defined by this guard value B. Specifically, when the reference valve varying rate is at A1 in the drawing, the valve timing varying rate is limited to guard value B1 that is obtained based on the accelerator opening degree varying rate (α2) therefor, and the valve timing varying operation (the operation of varying to the advance side) is performed at the rate of guard value B1.

In step ST8, whether reference valve timing varying rate A exceeds retard side guard value C is determined. When it is NO, then it is determined that the control direction of the valve timing is on retard side and the reference valve timing varying rate (the rate of varying toward retard side) is relatively high and faster than guard value C (i.e., reference valve timing varying rate A is a negative value and less than guard value C: for example at the positions of points A3 and A4 in FIG. 6B), and the process goes to step ST10 where a valve timing varying operation is performed with the valve timing varying rate defined by this guard value C. Specifically, when the reference valve varying rate is at A3 in the drawing, the valve timing varying rate is limited to guard value C1 that is obtained based on the accelerator opening degree varying rate (β1) therefor, and the valve timing varying operation (the operation of varying to the retard side) is performed at the rate of guard value C1.

When it is determined YES in step ST8, it is determined that the control direction of the valve timing is on retard side and the reference valve timing varying rate (the varying rate toward retard side) is relatively low and slower than guard value C (i.e., reference valve timing varying rate A is a negative value and at least guard value C: for example at the position of point A5 in FIG. 6B), or, since in this case determination of YES has already been made in step ST7, it is determined that the control direction of the valve timing is on advance side and reference valve timing varying rate A (the varying rate toward advance side) is relatively low and slower than guard value B (i.e., reference valve timing varying rate A is a positive value and less than guard value B: for example at the position of point A6 in FIG. 6B). The process goes to step ST11, and without placing a limit on the valve timing varying rate, it performs the valve timing varying operation with reference valve timing varying rate A as it is.

Thus, in the present embodiment, as for reference valve timing varying rate A obtained by deviation Δφ between target VVT phase φT and actual VVT phase φ, when varying rate Δθth of the accelerator opening degree resulting from the manipulation of the driver is relatively slow, it is determined that the driver does not require a quick variation of the valve timing, and a limit is placed on the valve timing varying rate. Specifically, when reference valve timing varying rate A obtained by the gain calculation map is A6 in FIG. 6B, since varying rate Δθth of the accelerator opening degree is relatively high (α1 in the drawing), the valve timing varying operation is performed with the value of A6 (reference valve timing varying rate A) as it is. On the other hand, when reference valve timing varying rate A obtained by the gain calculation map is A1 in FIG. 6B (which is the same rate as A6), since varying rate Δθth of the accelerator opening degree is relatively low (α2 in the drawing), the value of A1 (reference valve timing varying rate A) is not used and the valve timing varying operation is performed in a state where a limit is placed on the valve timing varying rate (to be slow) with the guard value (B1 in the drawing) corresponding to the varying rate α2 of the accelerator opening degree therefor (the control direction is indicated by an arrow in FIG. 6B). This can prevent the valve timing from sharply varying despite a small manipulation of the accelerator opening degree and inviting great variation in the output torque of engine 1. As a result, occurrence of shock in the vehicle body can be prevented, and the drivability can be improved. This holds true for the case where the valve timing is controlled toward retard side.

As described above, when varying rate Δθth of the accelerator opening degree resulting from the manipulation of the driver is relatively fast, reference valve timing varying rate A is used as it is to vary the valve timing. This can quickly approximate actual VVT phase φT to target VVT phase φT, to meet the requirement of the driver (such as quick acceleration or deceleration).

As described above, in the guard calculation map (FIG. 6B), second prescribed rate β is set to a value lower than first prescribed rate α. That is, the limit on the valve timing varying rate when the valve timing is to be retarded is loose. Accordingly, when accelerator opening degree is increased and reduced at the same rate (for example, at an intermediate rate between first prescribed rate α and second prescribed rate β: for example rate γ in the drawing), if the manipulation of reducing the accelerator opening degree is performed, that is, if intake valve 9 is controlled toward retard side, the rate (the retarding rate of the valve timing toward retard side) becomes relatively high (the limit on the rate is small, since the valve timing varying rate is not in the range where the guard value is obtained as a smaller value as the varying rate of the accelerator opening degree is smaller: for example, at point A7 in the drawing, the limit of guard value C is not placed), whereby it becomes possible to make the valve overlap small in a short period, and to rapidly reduce the amount of combustion gas returning from inside of a cylinder to the intake system (what is called an internal EGR (Exhaust Gas Recirculation) amount) to reserve the amount of the air-fuel mixture to be provided to the cylinder, thereby stabilizing the operation state of engine 1. Conversely, when the valve timing is advanced at the rate γ, the aforementioned occurrence of shock is concerned. Therefore, assuming that the manipulation of increasing accelerator opening degree is performed at the same rate as above, that is, if the valve is controlled toward advance side, the rate (the advancing rate of the valve timing toward advance side) becomes relatively low (the limit on the rate is great, since the valve timing varying rate is in the range where the guard value is obtained as a smaller value as the varying rate of the accelerator opening degree is smaller, and thus becomes low relative to the retarding rate of the valve timing toward retard side: for example, valve timing varying rate at point A8 in the drawing is limited to guard value B2). Thus, a sharp torque variation is avoided and occurrence of shock in the vehicle body is prevented, and whereby drivability is improved.

Other Embodiment

In the above-described embodiment, application of the present invention as VVT that varies the valve timing of intake valve 9 has bee described. The present invention is not limited thereto, and it can be applied as VVT 70 that varies the valve timing of exhaust valve 10, or as VVT 70 that varies the valve timing of both of intake valve 9 and exhaust valve 10. It is noted that the model, the number of cylinders, fuel-injection scheme and any other specification of engine 1 to which the present invention is applied are not specifically limited.

In the above-described embodiment, application of the present invention to a motor-driven variable valve timing apparatus has been described, in which phase-varying mechanism 80 is driven with drive power from VVT motor 25 constituted of a motor to vary the rotation phase of camshaft 21 with respect to crankshaft 62 and thereby vary a valve timing. The present invention is not limited thereto, and is also applicable to a variable valve timing control apparatus wherein valve timing varying rate is increased by utilizing torque reversals in a camshaft caused by the forces of opening and closing valves (for example as disclosed in Japanese Patent Laying-Open No. 2004-156603), or to a variable valve timing control apparatus switching ON/OFF of conduction of an electromagnetic brake to control the valve timing (for example as disclosed in Japanese Patent Laying-Open No. 2002-227615), or to a variable valve timing control apparatus having an electrohydraulic pump as the drive source, wherein a hydraulic pressure produced by the electrohydraulic pump is employed to control the valve timing (for example as disclosed in Japanese Patent Laying-Open No. 11-62643).

It is noted that guard lines B, C in the gain calculation map and the guard calculation map can arbitrarily be set. For example, guard lines B, C in the guard calculation map can be set linearly as shown by imaginary lines in FIG. 6B. In this case, for the entire range of the accelerator manipulation, the guard value can be obtained as a smaller value as the accelerator manipulation rate is lower.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A variable valve timing control apparatus for varying an opening and closing timing of at least one of an intake valve and an exhaust valve of an internal combustion engine, comprising:
   an accelerator opening degree sensor sensing an accelerator opening degree resulting from manipulation of a driver; and
   an operation unit, wherein
   said operation unit calculates a timing deviation that is a difference between a target valve timing and an actual valve timing, calculates a varying rate of said accelerator opening degree, and adjusts a valve timing varying rate in approximating the actual valve timing to the target valve timing, based on said timing deviation and said varying rate of said accelerator opening degree.

2. The variable valve timing control apparatus according to claim 1, further comprising
   a phase varying mechanism that varies a rotation phase of a camshaft with respect to a crankshaft of the internal combustion engine to vary a valve timing, wherein
   said phase varying mechanism is driven with drive power from a motor to vary the opening and closing timing of the valve.

3. An internal combustion engine comprising the variable valve timing control apparatus according to claim 1, wherein an opening and closing timing of at least one of an intake valve and an exhaust valve is varied.

4. A variable valve timing control apparatus for varying an opening and closing timing of at least one of an intake valve and an exhaust valve of an internal combustion engine, comprising:
   an accelerator opening degree sensor sensing an accelerator opening degree resulting from manipulation of a driver; and
   an operation unit, wherein
   said operation unit calculates a timing deviation that is a difference between a target valve timing and an actual valve timing, calculates a varying rate of said accelerator opening degree, and compares a valve timing varying rate obtained by said timing deviation with a valve timing varying rate limiting value obtained by said varying rate of said accelerator opening degree, wherein
   when said valve timing varying rate does not exceed said valve timing varying rate limiting value, said operation unit executes a valve timing control operation of approximating said actual valve timing to said target valve timing with said valve timing varying rate, and wherein
   when said valve timing varying rate exceeds said valve timing varying rate limiting value, said operation unit executes a valve timing control operation of approximating said actual valve timing to said target valve timing with said valve timing varying rate limiting value.

5. The variable valve timing control apparatus according to claim 4, wherein
   said valve timing varying rate limiting value is obtained as a smaller value as said varying rate of said accelerator opening degree is smaller.

6. The variable valve timing control apparatus according to claim 4, wherein
   said valve timing varying rate limiting value is obtained as a constant value when said varying rate of said accelerator opening degree exceeds a prescribed rate, and
   said valve timing varying rate limiting value is obtained as a smaller value as said varying rate of said accelerator opening degree is smaller when said varying rate of said accelerator opening degree is at most said prescribed rate.

7. The variable valve timing control apparatus according to claim 4, wherein
   said valve timing varying rate limiting value is obtained as a constant value when said varying rate in an accelerator manipulation direction controlling a valve timing toward advance side exceeds a first prescribed rate, and
   said valve timing varying rate limiting value is obtained as a smaller value as said varying rate in the accelerator manipulation direction controlling a valve timing toward advance side is smaller when said varying rate in the accelerator manipulation direction controlling a valve timing toward advance side is at most said first prescribed rate, wherein
   said valve timing varying rate limiting value is obtained as a constant value when said varying rate in an accelerator manipulation direction controlling a valve timing toward retard side exceeds a second prescribed rate, wherein
   said valve timing varying rate limiting value is obtained as a smaller value as said varying rate in the accelerator manipulation direction controlling a valve timing toward retard side is smaller when said varying rate in the accelerator manipulation direction controlling a valve timing toward retard side is at most said second prescribed rate, and wherein
   said second prescribed rate is set to a value lower than said first prescribed rate.

8. The variable valve timing control apparatus according to claim 4, further comprising
   a phase varying mechanism that varies a rotation phase of a camshaft with respect to a crankshaft of the internal combustion engine to vary a valve timing, wherein
   said phase varying mechanism is driven with drive power from a motor to vary the opening and closing timing of the valve.

9. A variable valve timing control apparatus for varying an opening and closing timing of at least one of an intake valve and an exhaust valve of an internal combustion engine, comprising:

accelerator opening degree sensing means for sensing an accelerator opening degree resulting from manipulation of a driver;

timing deviation calculating means for calculating a timing deviation that is a difference between a target valve timing and an actual valve timing;

accelerator manipulation rate calculating means for calculating a varying rate of said accelerator opening degree; and valve timing varying rate adjusting means for adjusting a valve timing varying rate in approximating the actual valve timing to the target valve timing, based on said timing deviation and said varying rate of said accelerator opening degree.

10. The variable valve timing control apparatus according to claim 9, further comprising a phase varying mechanism that varies a rotation phase of a camshaft with respect to a crankshaft of the internal combustion engine to vary a valve timing, wherein said phase varying mechanism is driven with drive power from a motor to vary the opening and closing timing of the valve.

11. An internal combustion engine comprising the variable valve timing control apparatus according to claim 9, wherein an opening and closing timing of at least one of an intake valve and an exhaust valve is varied.

12. A variable valve timing control apparatus for varying an opening and closing timing of at least one of an intake valve and an exhaust valve of an internal combustion engine, comprising:

accelerator opening degree sensing means for sensing an accelerator opening degree resulting from manipulation of a driver;

timing deviation calculating means for calculating a timing deviation that is a difference between a target valve timing and an actual valve timing;

accelerator manipulation rate calculating means for calculating a varying rate of said accelerator opening degree; and valve timing varying rate adjusting means for receiving outputs of said timing deviation calculating means and said accelerator manipulation rate calculating means and comparing a valve timing varying rate obtained by said timing deviation with a valve timing varying rate limiting value obtained by said varying rate of said accelerator opening degree, wherein when said valve timing varying rate does not exceed said valve timing varying rate limiting value, said valve timing varying rate adjusting means executes a valve timing control operation of approximating said actual valve timing to said target valve timing with said valve timing varying rate, and wherein when said valve timing varying rate exceeds said valve timing varying rate limiting value, said valve timing varying rate adjusting means executes a valve timing control operation of approximating said actual valve timing to said target valve timing with said valve timing varying rate limiting value.

13. The variable valve timing control apparatus according to claim 12, wherein said valve timing varying rate limiting value is obtained as a smaller value as said varying rate of said accelerator opening degree is smaller.

14. The variable valve timing control apparatus according to claim 12, wherein said valve timing varying rate limiting value is obtained as a constant value when said varying rate of said accelerator opening degree exceeds a prescribed rate, and said valve timing varying rate limiting value is obtained as a smaller value as said varying rate of said accelerator opening degree is smaller when said varying rate of said accelerator opening degree is at most said prescribed rate.

15. The variable valve timing control apparatus according to claim 12, wherein said valve timing varying rate limiting value is obtained as a constant value when said varying rate in an accelerator manipulation direction controlling a valve timing toward advance side exceeds a first prescribed rate, and said valve timing varying rate limiting value is obtained as a smaller value as said varying rate in the accelerator manipulation direction controlling a valve timing toward advance side is smaller when said varying rate in the accelerator manipulation direction controlling a valve timing toward advance side is at most said first prescribed rate, wherein said valve timing varying rate limiting value is obtained as a constant value when said varying rate in an accelerator manipulation direction controlling a valve timing toward retard side exceeds a second prescribed rate, wherein said valve timing varying rate limiting value is obtained as a smaller value as said varying rate in the accelerator manipulation direction controlling a valve timing toward retard side is smaller when said varying rate in the accelerator manipulation direction controlling a valve timing toward retard side is at most said second prescribed rate, and wherein said second prescribed rate is set to a value lower than said first prescribed rate.

16. The variable valve timing control apparatus according to claim 12, further comprising a phase varying mechanism that varies a rotation phase of a camshaft with respect to a crankshaft of the internal combustion engine to vary a valve timing, wherein said phase varying mechanism is driven with drive power from a motor to vary the opening and closing timing of the valve.

17. A variable valve timing control method of varying an opening and closing timing of at least one of an intake valve and an exhaust valve of an internal combustion engine, comprising the steps of:

sensing an accelerator opening degree resulting from manipulation of a driver;

calculating a timing deviation that is a difference between a target valve timing and an actual valve timing;

calculating a varying rate of said accelerator opening degree; and adjusting a valve timing varying rate in approximating the actual valve timing to the target valve timing, based on said timing deviation and said varying rate of said accelerator opening degree.

18. The variable valve timing control apparatus according to claim 17, further comprising a phase varying mechanism that varies a rotation phase of a camshaft with respect to a crankshaft of the internal combustion engine to vary a valve timing, wherein said phase varying mechanism is driven with drive power from a motor to vary the opening and closing timing of the valve.

19. A variable valve timing control method of varying an opening and closing timing of at least one of an intake valve and an exhaust valve of an internal combustion engine, comprising the steps of:

sensing an accelerator opening degree resulting from manipulation of a driver;

calculating a timing deviation that is a difference between a target valve timing and an actual valve timing;

calculating a varying rate of said accelerator opening degree;

comparing a valve timing varying rate obtained by said timing deviation with a valve timing varying rate limiting value obtained by said varying rate of said accelerator opening degree;

when said valve timing varying rate does not exceed said valve timing varying rate limiting value, executing a valve timing control operation of approximating said actual valve timing to said target valve timing with said valve timing varying rate; and when said valve timing varying rate exceeds said valve timing varying rate limiting value, executing a valve timing control operation of approximating said actual valve timing to said target valve timing with said valve timing varying rate limiting value.

20. The variable valve timing control method according to claim 19, wherein said valve timing varying rate limiting value is obtained as a smaller value as said varying rate of said accelerator opening degree is smaller.

21. The variable valve timing control method according to claim 19, wherein said valve timing varying rate limiting value is obtained as a constant value when said varying rate of said accelerator opening degree exceeds a prescribed rate, and said valve timing varying rate limiting value is obtained as a smaller value as said varying rate of said accelerator opening degree is smaller when said varying rate of said accelerator opening degree is at most said prescribed rate.

22. The variable valve timing control method according to claim 19, wherein said valve timing varying rate limiting value is obtained as a constant value when said varying rate in an accelerator manipulation direction controlling a valve timing toward advance side exceeds a first prescribed rate, and said valve timing varying rate limiting value is obtained as a smaller value as said varying rate in the accelerator manipulation direction controlling a valve timing toward advance side is smaller when said varying rate in the accelerator manipulation direction controlling a valve timing toward advance side is at most said first prescribed rate, wherein said valve timing varying rate limiting value is obtained as a constant value when said varying rate in an accelerator manipulation direction controlling a valve timing toward retard side exceeds a second prescribed rate, wherein said valve timing varying rate limiting value is obtained as a smaller value as said varying rate in the accelerator manipulation direction controlling a valve timing toward retard side is smaller when said varying rate in the accelerator manipulation direction controlling a valve timing toward retard side is at most said second prescribed rate, and wherein said second prescribed rate is set to a value lower than said first prescribed rate.

23. The variable valve timing control method according to claim 19, further comprising a phase varying mechanism that varies a rotation phase of a camshaft with respect to a crankshaft of the internal combustion engine to vary a valve timing, wherein said phase varying mechanism is driven with drive power from a motor to vary the opening and closing timing of the valve.

* * * * *